April 23, 1957     A. S. PETERSON     2,789,595
RECIPROCABLE WORK GUIDE FOR SAW TABLES
Filed Dec. 13, 1954     3 Sheets-Sheet 1
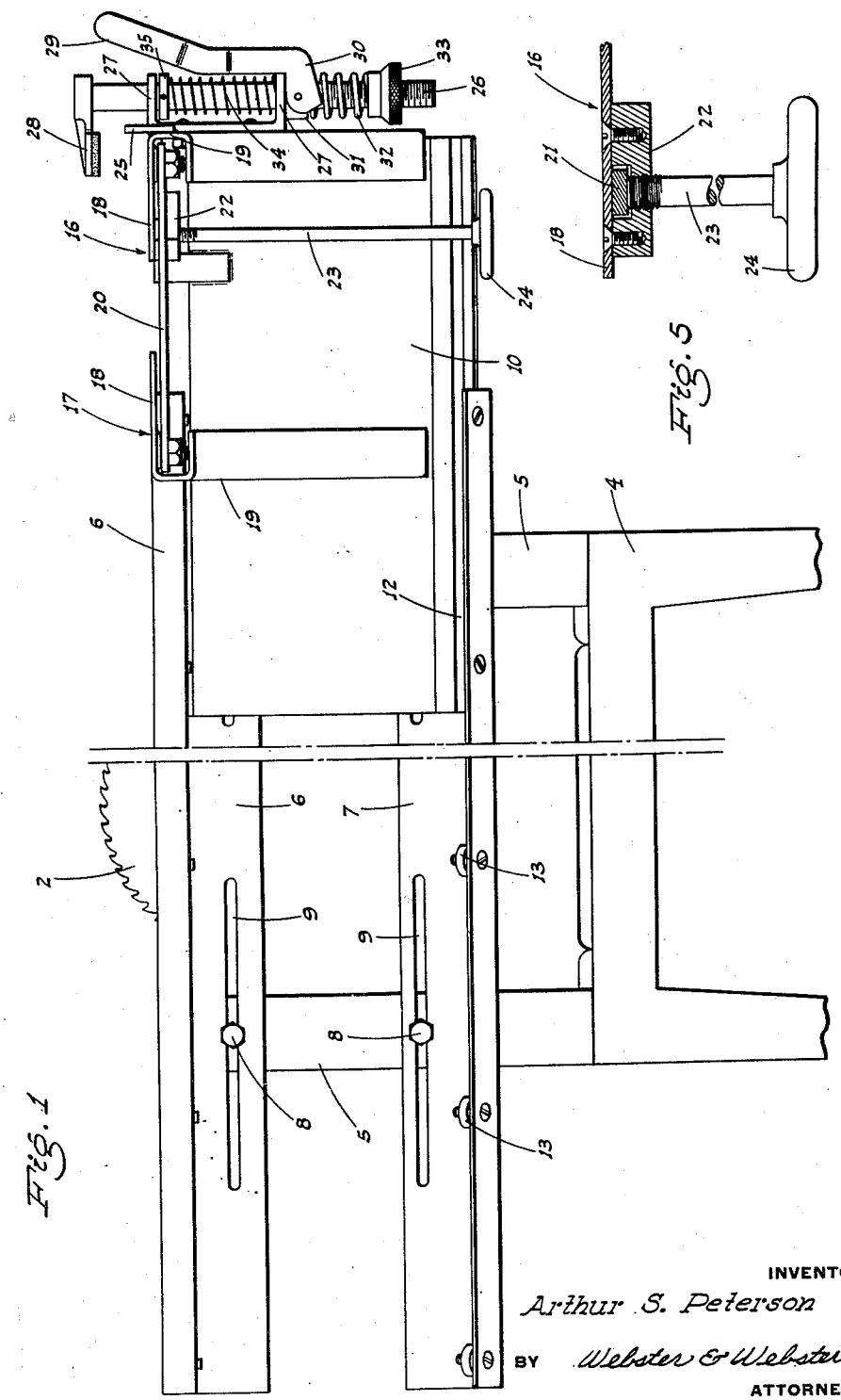
INVENTOR
Arthur S. Peterson
BY Webster & Webster
ATTORNEYS

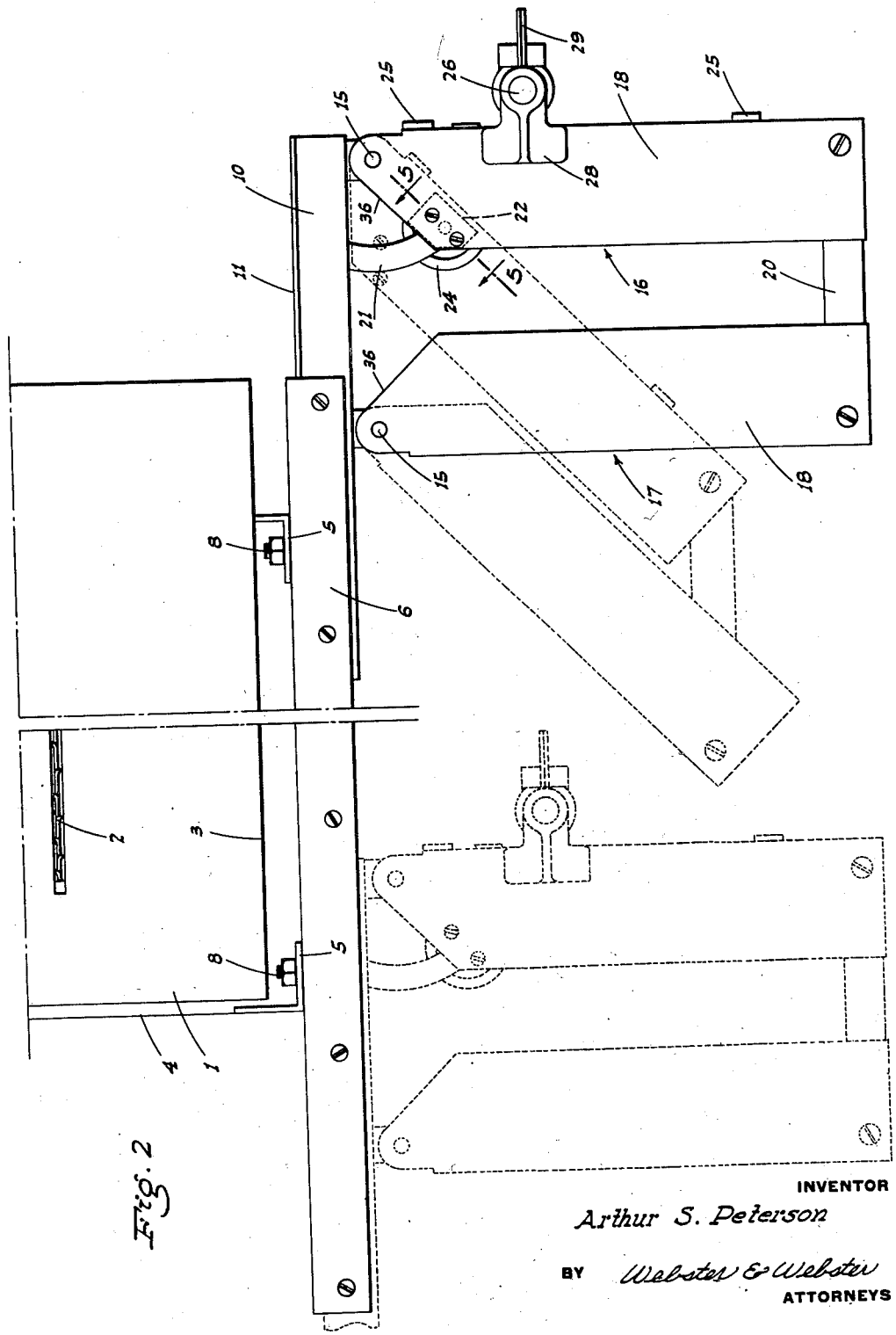

April 23, 1957  A. S. PETERSON  2,789,595
RECIPROCABLE WORK GUIDE FOR SAW TABLES
Filed Dec. 13, 1954  3 Sheets-Sheet 3
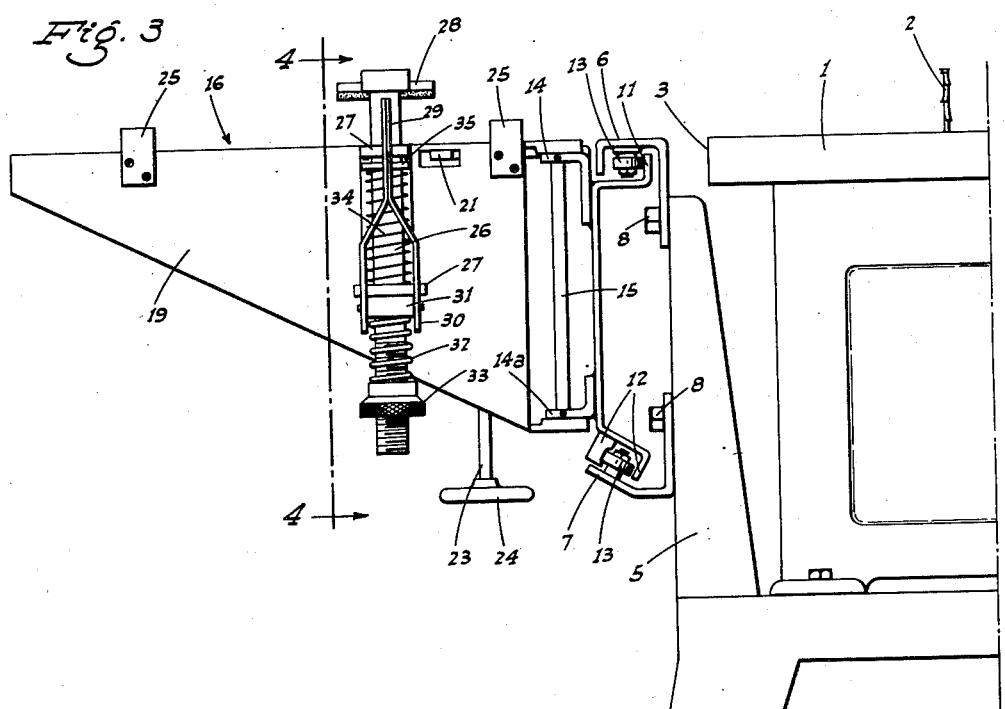
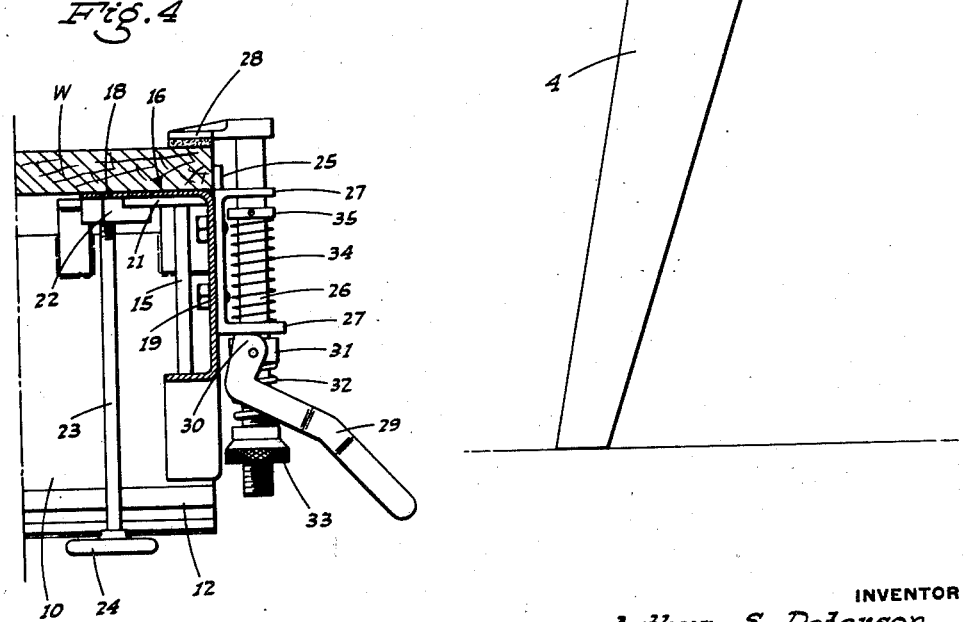
INVENTOR
Arthur S. Peterson
BY Webster & Webster
ATTORNEYS

United States Patent Office 2,789,595
Patented Apr. 23, 1957

2,789,595

RECIPROCABLE WORK GUIDE FOR SAW TABLES

Arthur S. Peterson, Grass Valley, Calif.

Application December 13, 1954, Serial No. 474,953

3 Claims. (Cl. 143—52)

This invention relates to table or bench saws; a major object being to provide a work support or table—adapted to be mounted on one side of the saw table—by means of which work may be supported and clamped in a fixed position for engagement by, and movement past, the saw. By reason of this feature the work—such as a board or beam—may be fed through the saw in a definite path, without it being necessary for the operator to endanger his eyes and hands by close watching and holding of the work.

Another object of the invention is to mount the work support so that the work may be readily disposed and clamped in any desired angular relation to the saw. Drifting of the work when making bevel cuts, such as frequently occurs when the work is held by hand against the conventional form of guide, is avoided, and large heavy pieces which are particularly hard to handle and guide by hand through the saw may be handled with ease and accuracy with my improved device.

By reason of my improved work support and guide therefore, not only is safety to the operator promoted, but long pieces of work which ordinarily require the services of two men to handle may be quickly and accurately set for cutting and moved past the saw by a single operator. Also, the sphere of usefulness of the ordinary relatively small portable table saw, such as is used by home craftsmen, mechanics, and contractors, is greatly increased, by reason of the fact that my improved device adapts such saws to handle long pieces of work easily and with an assured accuracy of cut.

A further object of the invention is to provide a work guide for saw tables which is designed for ease and economy of manufacture.

Still another object of the invention is to provide a practical, reliable, and durable work guide for saw tables, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the improved work guide as mounted on a saw table; the latter being shown foreshortened.

Fig. 2 is a top plan view of the guide as mounted on the saw table; said guide being shown in different positions by dotted lines.

Fig. 3 is an end view of the guide device as mounted on the saw table.

Fig. 4 is a fragmentary vertical section on line 4—4 of Fig. 3.

Fig. 5 (Sheet 1) is a fragmentary vertical section on line 5—5 of Fig. 2.

Referring now more particularly to the drawings and to the characters of reference marked thereon, my improved work guide is adapted to be mounted in unitary connection with a conventional table saw unit which includes a table 1 from which a circular saw 2 projects upwardly some distance laterally in from the outer longitudinal side edge 3 of the table, and which edge is disposed at right angles to the axis of the saw, or parallel to the face of the saw. The table is supported on a stand or base 4.

The work guide structure, which cooperates with the table 1, is constructed as follows:

Secured on base 4 in upstanding relation adjacent the plane of the table edge 3, but terminating below the table, are longitudinally spaced uprights 5, against the outer faces of which upper and lower longitudinally extending rails 6 and 7, respectively, are secured for longitudinal adjustment by means of bolts 8 passing through longitudinal slots 9 in the rails. The length of the rails is such that they may extend from adjacent the back end of the table 1 to a point some distance beyond the forward or discharge end of the table, as shown in Fig. 2.

Slidably supported from the rails for movement along the same is a carriage 10 having top and bottom flange elements 11 and 12, respectively, arranged to cooperate with guide rollers 13 mounted at intervals in the rails 6 and 7.

Mounted on the carriage 10, and projecting laterally out therefrom, are longitudinally spaced pairs of upper and lower brackets 14 and 14a, respectively, which support vertical spindles 15 extending therebetween. Mounted on and projecting laterally out from the spindles are spaced front and rear work support and guide units 16 and 17, respectively. Each unit comprises a generally rectangular work supporting table or platform 18 disposed on a level with table 1 and engaging the upper bracket 14 and a flange 19 depending from the platform 18 and engaging the lower bracket 14a, as shown in Fig. 3. The flanges 19 extend along the rear and front edges, respectively, of the rear and front tables or platforms 18.

A parallel link 20 connects tables 18 adjacent their outer end so that said tables may swing as a unit horizontally from one angular position to another relative to the table 1, besides being capable of longitudinal movement as a unit relative to table 1 irrespective of their angular setting, as indicated in Fig. 2.

In order to hold the work supports in any desired angular position, a clamping device is arranged in connection with the unit 16. This device comprises a quadrant 21 concentric with the spindle 15 of such unit, and secured at one end on carriage 10 and projecting from said end under the table 18 immediately adjacent the same. The quadrant projects through a block 22 secured on the under side of the table 18, as shown in Fig. 5; a depending locking screw 23 being threaded through the block and engaging the quadrant. The screw depends a sufficient distance from the table 18 so that a hand wheel 24 on the lower end of the screw is exposed clear of the flange 19 for convenient operation, as shown in Fig. 3.

Secured on said flange 19 of unit 16 are work stops 25 upstanding from the table 18 and suitably spaced along the back edge thereof. Also mounted on said flange is a work clamping device disposed between the stops 25. This device comprises an upstanding spindle 26 slidable in a bracket mounted on the flange 19 and including vertically spaced ears 27.

A clamping head 28 is fixed on the upper end of the spindle 26 in overhanging relation to the table 18. In order to lower the head 28 into clamping engagement with a piece of work resting on the table 18 and engaging stops 25, a lever 29 is provided; this lever including a cam portion 30 on its lower end to cooperate with the lower bracket ear and pivoted on a collar 31 slidable on the spindle below the bracket. A relatively heavy spring 32 is disposed on the spindle between the collar 31 and an adjustable nut 33 on the spindle below said collar.

A light spring 34 on the spindle between said lower ear 27 and a collar 35 fixed on the spindle below the upper ear 27 normally holds the head 28 in a raised position above the table 18 a distance greater than the thickness of any piece of work likely to be handled by the saw 2.

The cam portion 30 is arranged so that downward movement of the lever 29 will lower the spindle 26 until the head 28 engages a piece of work W resting on the table and engaging the stops 25; the spring 32 yielding only after the head is firmly engaged with the work, and enabling the lever 29 to be lowered to a past dead-center locked position, as shown in Fig. 4.

It will therefore be seen that by means of the above described structure, a piece of work W—too long to rest entirely on the table 1—may be supported and clamped in position, set and held at any desired angle to the saw 2, and moved through the same from one side of the table 1 without the hands of the operator being near the saw 2 at any time.

The adjacent edges of the tables 18 are oppositely beveled from the spindles 15 from a short portion of the length of such edges, as shown at 36 in Fig. 2, so that said tables may swing in opposite directions from a right angle position without contacting the upper rail 6 when they so swing; the spindles 15 being preferably disposed adjacent the front and rear edges of the units 16 and 17, respectively, as shown.

It should be noted here that the rails are mounted for adjustment lengthwise of the table for the following reason: If a right-hand compound bevel cut is to be made with the saw blade tilted, and with the platforms correspondingly adjusted, the rails will be adjusted further forwardly in order to change the zone of travel, since the angular position of the work would throw it away from the saw and toward the operator. Conversely, if a left-hand compound cut is to be made, it might be necessary to shift the rails rearwardly or in the direction of the operator.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A work support and guide device for a table saw which includes a table having a longitudinal side edge and a saw upstanding from the table laterally inward from and parallel to said edge; the device comprising a work supporting platform disposed on a level with the saw table, a supporting rail unit fixed with the table saw laterally out from but adjacent said table edge and parallel thereto, means mounting the platform in supported connection with the rail unit for horizontal movement lengthwise of the table, and means mounting the rail unit in connection with the table for adjustment lengthwise thereof; said last named means comprising, with rigid uprights fixed with the table and against which the rail unit abuts, clamping bolts mounted in said uprights, the rail unit having elongated horizontal slots through which said bolts project.

2. A work support and guide device for a table saw which includes a table having a longitudinal side edge and a saw upstanding from the table laterally inward from and parallel to said side edge; the device comprising a pair of work supporting platforms disposed in spaced relation lengthwise of the saw table and projecting laterally out therefrom on a level with the table, a supporting rail unit fixed on the table saw between the platforms and said edge of the table, a carriage slidably supported by the rail unit for movement lengthwise thereof and of the table, means pivoting the platforms on the carriage at the ends of said platforms adjacent the carriage for angular adjustment relative thereto in a horizontal plane, and a parallel link connection between the platforms adjacent the outer end thereof.

3. A work support and guide device for a table saw which includes a table having a longitudinal side edge and a saw upstanding from the table laterally inward from and parallel to said edge; the device comprising a work supporting platform disposed on a level with the saw table, a supporting rail unit fixed with the table saw laterally out from but adjacent said table edge and parallel thereto, a carriage mounted on the rail unit for horizontal movement lengthwise of the saw table, the platform projecting laterally out from the carriage, and means pivoting the carriage platform at its side nearest the carriage, on said carriage; the adjacent portions of the end edges of the platform being disposed relative to the pivot means so that the platform may be swung at an acute angle to the longitudinal plane of the carriage in both directions from a position of said platform at right angles to the carriage.

References Cited in the file of this patent

UNITED STATES PATENTS

| | | |
|---|---|---|
| 608,012 | Stirckler | July 26, 1898 |
| 707,641 | Rostochil | Aug. 26, 1902 |
| 901,699 | Fetzer | Oct. 20, 1908 |
| 922,338 | Root | May 18, 1909 |
| 1,429,097 | Phillips | Sept. 12, 1922 |
| 1,452,233 | Zsuffa | Apr. 17, 1923 |
| 1,794,758 | Dittmar | Mar. 3, 1931 |
| 2,134,823 | Hermann et al. | Nov. 1, 1938 |
| 2,157,345 | Nelson | May 9, 1939 |
| 2,316,073 | Kellogg | Apr. 6, 1943 |
| 2,401,972 | Sellmeyer | June 11, 1946 |
| 2,492,824 | Ahrndt et al. | Dec. 27, 1949 |
| 2,554,730 | Chandler | May 29, 1951 |